(No Model.)
J. W. McKEE.
Drag Sawing Machine.
No. 236,236. Patented Jan. 4, 1881.
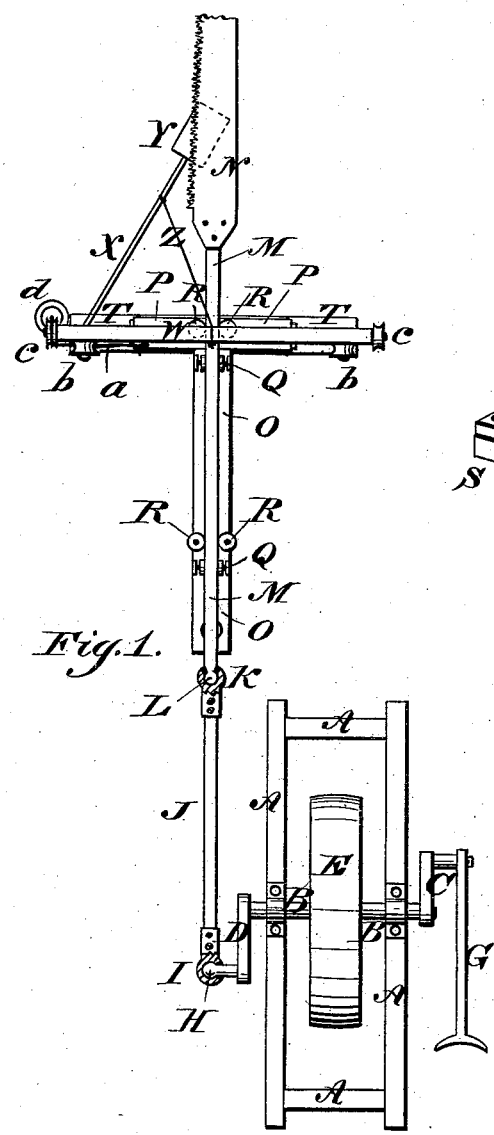
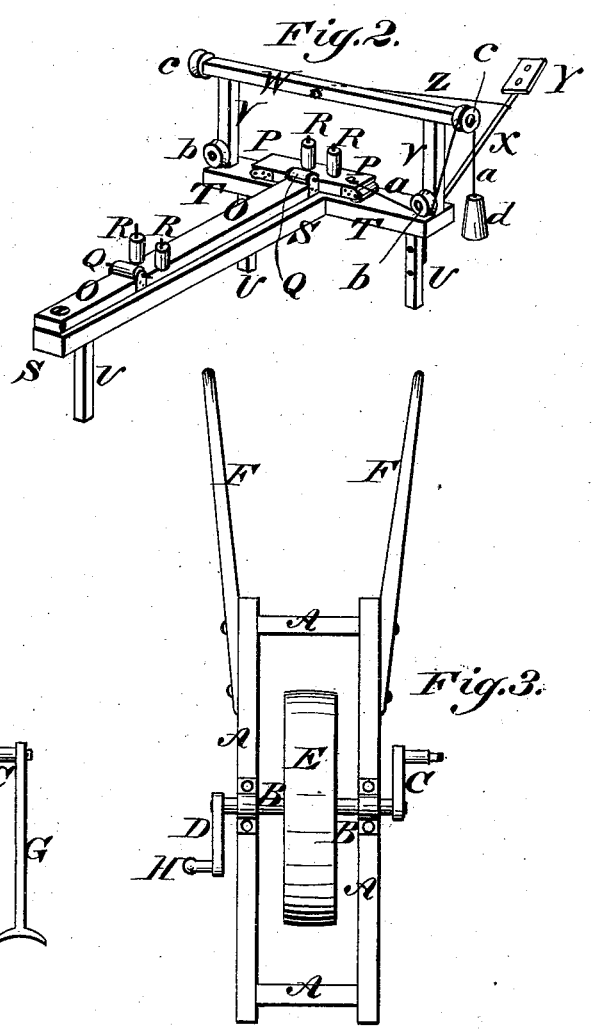
WITNESSES:
Donn P. Twitchell
C. Sedgwick
INVENTOR:
J. W. McKee
BY Munn & Co
ATTORNEYS.

UNITED STATES PATENT OFFICE.

JOHN W. McKEE, OF MOSELLE, MISSOURI.

DRAG-SAWING MACHINE.

SPECIFICATION forming part of Letters Patent No. 236,236, dated January 4, 1881.

Application filed November 8, 1880. (No model.)

*To all whom it may concern:*

Be it known that I, JOHN W. MCKEE, of Moselle, in the county of Franklin and State of Missouri, have invented a new and useful Improvement in Drag-Sawing Machines, of which the following is a specification.

Figure 1 is a plan view of the improvement. Fig. 2 is a perspective view of the saw-carriage and saw-carriage frame. Fig. 3 is a plan view of the balance-wheel and its frame.

Similar letters of reference indicate corresponding parts.

The object of this invention is to furnish hand sawing-machines designed especially for sawing down standing trees, but which may also be used with advantage for sawing the trees after they have been cut down, and which shall be so constructed that it can be readily moved from place to place.

In the accompanying drawings, A is a rectangular frame, supported upon legs of such a length as to raise the frame A to a convenient height, which legs are not shown in the drawings. In bearings attached to the side bars of the frame A revolves a shaft, B, having cranks C D attached to its ends. To the center of the shaft B is attached a wheel, E, which is made heavy to adapt it to serve as a fly-wheel. To one end of the frame A are attached handles F, so that the frame A and wheel E can be used in the manner of a wheelbarrow for transporting the machine from place to place. The crank C can be grasped by the sawyer in operating the machine, or it may have a pitman, G, pivoted to it for the sawyer to take hold of. Upon the end of the other crank, D, is formed a ball, H, to work in a socket, I, formed in or attached to the end of a connecting-rod, J. To the other end of the rod J is attached, or upon it is formed, a socket, K, to receive a ball, L, formed upon the rear end of the bar M, to the forward end of which the saw N is attached. The bar M rests and travels upon a carriage formed of the bar O, having a cross-bar, P, attached to its forward end, and provided with two horizontal rollers, Q, for the bar M to rest on, and two pairs of upright rollers, R, for the side edges of the bar M to rest against to keep the said bar in place and diminish the friction as the bar is operated. The bar O is pivoted at its rear end to the rear end of the bar S, which has a cross-bar, T, attached to its forward end. The cross-bar T of the carriage-frame is made longer than the cross-bar P of the carriage, so that the carriage can vibrate upon the carriage-frame.

To the lower sides of the ends of the bars S T are attached legs U to support the carriage-frame and the carriage, which legs U should be secured to the bars S T adjustably, so that the carriage-frame and carriage can be adjusted at such a height as will cause the saw N to cut the tree at any desired distance from the ground.

To the upper side of the ends of the cross-bar T are attached short posts V, to the upper ends of which are attached the ends of a cross-bar, W.

To one of the forward legs is attached the end of an arm, X, which has a small plate, Y, attached to its forward end to support the saw N while making a cut. The arm X and plate Y are supported by a rod, Z, the forward end of which is attached to the forward part of the arm X. The rear part of the rod Z is attached to the cross-bar W.

To one end of the cross-bar P of the carriage is attached the end of a cord, *a*, which passes around a guide-pulley, *b*, pivoted to the low end of the post V, around a guide-pulley, *c*, pivoted to the end of the cross-bar W, and has a weight, *d*, attached to its end of such a gravity as to feed and hold the saw to its work.

Pulleys *b c* are pivoted to both ends of the frame, so that the cord *a* and weight *d* can be placed at one or the other side, according to the direction in which the saw N is to make its cut.

The saw-support X Y Z can also be adjusted at one or the other side, according to the direction in which the saw is to make its cut.

In using the machine it is adjusted at the side of the tree and the tree is cut half through. The saw is then changed to the other side of the tree, and the saw-support X Y Z and the cord and weight *a d* are adjusted at the other side of the carriage-frame, and the other half of the tree is cut. The first cut is made upon the leaning side, so that the saw will not be pinched in its kerf.

Having thus described my invention, I claim as new and desire to secure by Letters Patent—

1. The combination, with the traveling bar M, of the pivoted bar O, having cross-bar P and two horizontal rollers, Q, the two pairs of upright rollers R, and the bar S, having cross-bar T, longer than cross-bar P, as and for the purpose specified.

2. In a hand sawing-machine, the combination, with the carriage-frame S T, having legs U, and upright frame V W, of the arm X, plate Y, and rod Z, substantially as herein shown and described, whereby the saw N is supported while making a cut, as set forth.

JOHN WILLIS McKEE.

Witnesses:
JAMES WALLACE,
JNO. H. SMITH.